Figure 1:
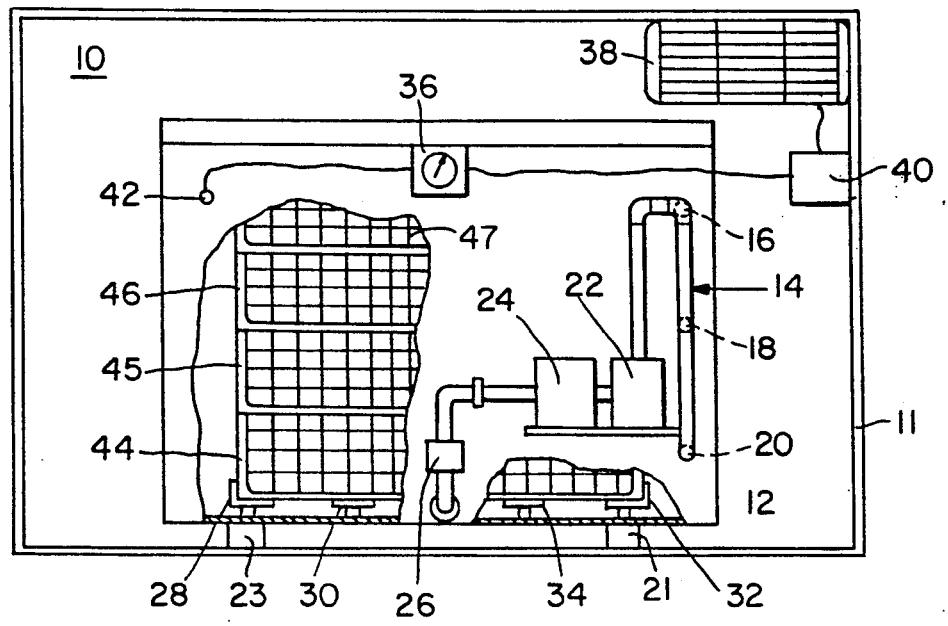

United States Patent [19]

Bergeron

[11] Patent Number: 5,237,959
[45] Date of Patent: Aug. 24, 1993

[54] CRUSTACEAN LIFE-SUPPORT AND TRANSPORT SYSTEM

[76] Inventor: Dana T. Bergeron, 3 Kimberly Dr., Danvers, Mass. 01923

[21] Appl. No.: 724,863

[22] Filed: Jul. 2, 1991

[51] Int. Cl.[5] ............................................. A01K 63/00
[52] U.S. Cl. .................................... 119/214; 119/201
[58] Field of Search ............................ 119/2, 3, 4, 5

[56] References Cited

U.S. PATENT DOCUMENTS

| | | | |
|---|---|---|---|
| 2,302,336 | 11/1942 | MacDonald | 119/4 |
| 3,025,831 | 3/1962 | Berardi | 119/2 |
| 3,192,899 | 7/1965 | Lucey et al. | 119/4 |
| 3,727,579 | 4/1973 | Lee | 119/2 |
| 4,089,298 | 5/1978 | Wilson | 119/4 |
| 4,300,477 | 11/1981 | Chapman | 119/2 |
| 4,559,902 | 12/1985 | Mason et al. | 119/4 |

*Primary Examiner*—John G. Weiss
*Attorney, Agent, or Firm*—Iandiorio & Dingman

[57] ABSTRACT

A self-contained crustacean life support and transport system including a container for holding crustaceans, a pump and pipe manifold with spray nozzles for spraying water into the container to wet the gills of the crustaceans, and a bottom drain in the tank for collecting sprayed water so that it may be returned to the pump to continuously recycle the water to allow the crustaceans to respire while out of their natural habitat.

13 Claims, 1 Drawing Sheet

CRUSTACEAN LIFE-SUPPORT AND TRANSPORT SYSTEM

FIELD OF INVENTION

This invention relates to a self contained crustacean life-support and transport system that allows crustaceans to be transported in great numbers across the country while also providing a means of indefinitely keeping crustaceans alive to maintain their freshness.

BACKGROUND OF INVENTION

Crustaceans, such as all types of lobster and crab, are an important food source, especially in coastal regions. Many types of crustaceans are considered delicacies, and as such are in demand throughout the country. However, most types of crustaceans are found in limited regional areas; for example, the American lobster is found along the northeast coast of the North American continent, from the Carolinas to Labrador.

Since crustaceans must typically be kept alive until just before they are to be eaten, crustaceans must be delivered alive and kept alive at any establishment desiring to sell them. This has created a need for efficiently transporting live crustaceans, as well as a simple and effective means of keeping crustaceans alive at the location to which they are delivered. Currently, crustaceans are typically transported on ice in boxes or crates. However, since crustacean's gills must be kept wet for them to respire, they can survive for only a matter of hours in such a state. Accordingly, if crustaceans are to be transported a distance from their point of origin, it has been necessary to transport them by air, which is prohibitively expensive. As a result, in the vast majority of the country, each of the non-indigenous crustaceans is typically an expensive delicacy which is often simply not available.

Even if the crustaceans can be transported, at the destination they are typically placed in tanks of water that is chemically treated to prevent crustacean waste from contaminating the water and killing the crustaceans. These tanks are large, heavy, and expensive to operate. Often, some or all of the crustaceans in the tanks suddenly die. Also, the tanks do nothing to prevent the crustaceans from killing one another while in the tanks.

SUMMARY OF INVENTION

It is therefore an object of this invention to provide a crustacean life-support system that allows crustaceans to be transported across great distances.

It is a further object of this invention to provide such a system which allows crustaceans to be delivered at relatively low cost.

It is a further object of this invention to provide such a system which can keep crustaceans alive indefinitely out of their natural habitat.

It is a further object of this invention to provide such a system that is relatively lightweight.

It is a further object of this invention to provide such a system that can transport thousands of crustaceans in a confined space.

It is a further object of this invention to provide such a system that will allow crustaceans to be sold at a reasonable price anywhere in the country.

This invention results from the realization that a truly effective crustacean life-support system that allows crustaceans to be shipped inexpensively across country may be accomplished by keeping the crustaceans' gills wet with a fine mist of continuously recycled water kept at a relatively low temperature to decrease the crustacean activity.

This invention may consist of a self-contained crustacean life-support system including a container for holding crustaceans, means for spraying water into the container to wet the gills of the crustaceans, and means for collecting sprayed water and returning it to the spraying means to allow the crustaceans to respire while out of their natural habitat. Preferably, the system also includes means for cooling the water to cool the crustaceans for decreasing their activity, including the respiration rate.

The water may be sprayed in the container with a pipe manifold having a plurality of spray nozzles. Preferably, the manifold runs along at least two sides of the container; it may run around three sides of the container. The spray nozzles are preferably spaced along at least two sides to create a mist within the container. Preferably, the manifold includes a number of vertically-spaced pipes to more uniformly spray water throughout the container.

The sprayed water may be collected with a drain in the container. Preferably, the container is tilted slightly toward the end containing the drain so that a very small amount of water can be continuously recycled to keep the crustacean's gills wet. This allows the transport system to be very light, as there is no need for the crustaceans to be submerged in water. A check valve between the drain and the pump is preferably included to prevent backflow through the drain. The water is preferably filtered at some point in the water-flow loop to inhibit clogging of the pump and/or spray nozzles.

The system preferably also includes a means such as a thermocouple for measuring the temperature in the container. There may further be included means for regulating the cooling to maintain a cool temperature in the container. In one embodiment, this means for regulating the temperature is responsive to the temperature measurement device for automatically maintaining a desired temperature in the container. A temperature of approximately 38° F. will keep the respiration rate and activity of the crustaceans to a minimum to preserve their freshness indefinitely during transport and storage out of the crustaceans' ambient environment.

DISCLOSURE OF PREFERRED EMBODIMENT

Figure 2:
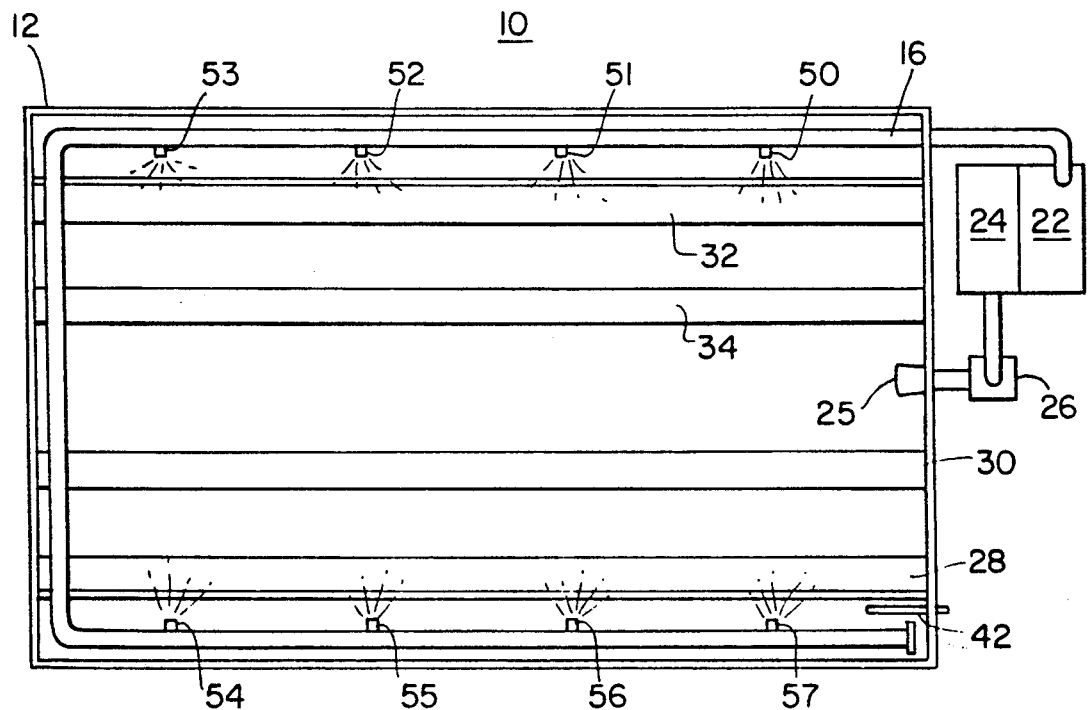

Other objects, features and advantages will occur to those skilled in the art from the following description of a preferred embodiment and the accompanying drawings, in which:

FIG. 1 is an end view, partly broken away, of the self-contained crustacean life-support and transport system according to this invention in a container such as a refrigerated truck; and FIG. 2 is a top plan view of the system of FIG. 1 showing the locations of the water spray nozzles that provide a fine mist in the container for keeping the crustacean's gills wet.

This invention may be accomplished with a self-contained crustacean life-support system that includes a container such as a large box sized to fit a refrigerated truck for holding crustaceans. The container may also have a dedicated refrigeration unit so that it may be transported in any truck or by air. Preferably, the container is able to accept a number of mesh baskets or trays that are stacked one on top of another for holding crustaceans at spaced vertical locations in the tank so that the tank may be virtually filled with crustaceans without crushing the ones at the bottom. To keep all of the several levels of crustaceans wet, there may be included a pipe manifold that runs along at least two walls of the tank having a plurality of spaced water spray nozzles for delivering a fine spray or mist of water throughout the tank. Preferably, the manifold has a plurality of different levels of piping spaced vertically along the walls of the tank for delivering the spray more directly to all of the trays of crustaceans. Then, individual crustaceans or entire trays of crustaceans may be removed as desired.

Water taken from the crustacean's natural habitat is preferably continuously recycled through the system by collecting water from the bottom of the container and pumping it back through the spray nozzles. This allows a very small amount of water to be used in relation to the number of crustaceans to keep the weight of the system as light as possible so that crustaceans can be transported over the roads rather than by air. As an example, a container approximately 4.5 feet wide by 9.5 feet long by 4 feet high having an approximate volume of 1280 gallons can hold thousands of American lobsters that may be kept alive indefinitely by maintaining the container interior temperature at below ambient temperature, for example 38° F., to effectively keep the crustaceans asleep; at the low temperature they are virtually inactive and have a decreased respiration rate so that they may live for extended periods without having to eat, and also to prevent the crustaceans from harming one another during transportation. If such a tank were used to store crustaceans in a typical manner, that is filled with water, the water alone would weigh approximately 10,688 pounds. Also, only enough crustaceans to form a few layers at the bottom could be stored in such a tank. In contrast, the system of this invention with a tank of that size needs only approximately 50 gallons (400 pounds) of water to keep an entire tank virtually filled with crustaceans alive indefinitely. This reduction in weight allows thousands and thousands of crustaceans to be transported across county in refrigerated trucks or by air at a very low transportation cost.

There is shown in FIG. 1 self-contained crustacean life-support and transport system 10 according to this invention. System 10 includes tank 12 shown in an end view with portions of the end broken away to show the interior construction. The bottom of tank 12 includes support rails 28, 30, 32 and 34 for holding crustacean transport trays 44 through 48. The trays may be sized as desired to hold the desired number of crustaceans each. The trays are preferably made from a non-corrosive material such as plastic and have a mesh-type construction to allow the water mist to bathe the crustaceans to keep their gills wet. Outer supports 28 and 32 are L-shaped to keep the baskets from shifting as the container is moved. Pump 24 draws water from the tank through check valve 26 and pumps the water through filter assembly 22 that removes particulates to prevent the nozzles and pump from clogging. Filter 22 may also chemically treat the water if necessary. The water is delivered from filter 22 into pipe manifold 14 containing vertically spaced horizontally-running pipes, 16, 18 and 20. Preferably, tank 12 is tilted slightly toward bottom drain 25 so that there need be enough water only to make a relatively small puddle around drain 25 so that pump 24 will not loose its prime.

The interior of container 12 is maintained at a below-ambient temperature such as 38° F. using refrigeration unit 38 mounted along with container 12 within space 11, which may be the interior of a refrigerated truck for transportation, or a refrigerated room for long term storage. Alternatively, the water itself, or the interior of container 12 may be directly cooled. In that case, the container may have a lid to help keep in the water and the cool temperature while allowing for infiltration of air to provide oxygen.

Interior temperature indicator 36 is responsive to thermocouple 42 mounted through the tank wall to measure the inside tank temperature. Refrigeration control system 40 may be used for automatically controlling refrigeration unit 38 in response to the container temperature to maintain a desired set point. If more than one container 12 is to be transported in the interior of a truck or airplane, refrigeration control unit 40 is preferably responsive to a temperature measurement means placed inside of the truck or airplane rather than inside a container for maintaining the entire truck interior at a given setpoint temperature.

As shown in the top view of FIG. 2, each of the piping manifolds 16, 18 and 20 includes a plurality of spaced spray nozzles for supplying a spray or mist of water throughout the entire interior of the tank; only the top manifold 16 is visible in the top view. Manifold 16 includes nozzles 50 through 57 evenly spaced along the two long sides of the tank for creating a fine cool water mist that keeps the gills of the crustaceans wet so that they stay alive while in the tank. It has been found that American lobsters kept in such an environment at 38° F. may be kept for days on end with virtually no effect on the crustaceans; when they are removed from the system they immediately return to their pre-storage state of vitality.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A self-contained life support system, comprising:
   a container;
   a plurality of mesh trays inserted into said container for holding crustaceans and allowing water to enter from the top and sides of the trays;
   means for spraying water into said container to wet the gills of crustaceans within said trays, said means for spraying including a pump feeding a pipe manifold along at least two sides of said container and including a plurality of spaced spray nozzles along said two sides for delivering a water mist into said container; and
   means for collecting sprayed water and returning it to said means for spraying to continuously recycle the water to allow the crustaceans to respire while out of their natural habitat.

2. The life support system of claim 1 further including means for cooling the water to cool the crustaceans to inhibit crustacean activity.

3. The life support system of claim 1 in which said manifold runs along three sides of said container.

4. The life support system of claim 1 in which said manifold includes a plurality of vertically-spaced pipes for more uniformly spraying water into said container.

5. The life support system of claim 1 in which said container has a bottom and four sides.

6. The life support system of claim 1 in which said means for collecting sprayed water includes a drain in said container.

7. The life support system of claim 6 in which said means for collecting sprayed water further includes a check valve for inhibiting water back flow through the drain.

8. The life support system of claim 1 in which said means for spraying includes a pump.

9. The life support system of claim 1 in which said means for spraying includes a water filter for filtering impurities.

10. The life support system of claim 2 further including means for measuring the temperature in said container.

11. The life support system of claim 10 further including means for regulating said means for cooling to maintain a cool temperature in said container.

12. The life support system of claim 11 in which said means for regulating is responsive to said means for measuring the temperature.

13. The life support system of claim 11 in which the temperature is maintained at approximately 38° F.

* * * * *